(12) United States Patent
Lou

(10) Patent No.: US 10,136,617 B2
(45) Date of Patent: Nov. 27, 2018

(54) COLLAR STRUCTURE FOR PETS

(71) Applicant: JC-SUNNY INTERNATIONAL CO., LTD, Taipei (TW)

(72) Inventor: Meng-Hsuan Lou, Taipei (TW)

(73) Assignee: JC-SUNNY INTERNATIONAL CO., LTD, Taipei (TW)

( * ) Notice: Subject to any disclaimer, the term of this patent is extended or adjusted under 35 U.S.C. 154(b) by 217 days.

(21) Appl. No.: 15/221,788

(22) Filed: Jul. 28, 2016

(65) Prior Publication Data

US 2017/0202183 A1   Jul. 20, 2017

(30) Foreign Application Priority Data

Jan. 20, 2016 (CN) .................... 2016 2 0052593 U

(51) Int. Cl.
| | |
|---|---|
| *A01K 27/00* | (2006.01) |
| *A01K 15/02* | (2006.01) |
| *A44B 11/02* | (2006.01) |
| *B32B 3/26* | (2006.01) |
| *B32B 5/02* | (2006.01) |
| *B32B 7/04* | (2006.01) |
| *B32B 25/06* | (2006.01) |
| *B32B 25/10* | (2006.01) |

(Continued)

(52) U.S. Cl.
CPC ............ *A01K 27/001* (2013.01); *A01K 15/02* (2013.01); *A01K 27/007* (2013.01); *A44B 11/02* (2013.01); *B32B 3/08* (2013.01); *B32B 3/266* (2013.01); *B32B 5/024* (2013.01); *B32B 7/04* (2013.01); *B32B 25/06* (2013.01); *B32B 25/10* (2013.01); *B32B 25/20* (2013.01); *B32B 2250/03* (2013.01); *B32B 2250/40* (2013.01); *B32B 2307/4023* (2013.01); *B32B 2307/51* (2013.01); *B32B 2413/00* (2013.01); *B32B 2433/00* (2013.01)

(58) Field of Classification Search
CPC .................................................... A01K 27/001
See application file for complete search history.

(56) References Cited

U.S. PATENT DOCUMENTS

| | | | |
|---|---|---|---|
| 4,491,090 A | * | 1/1985 | Almeida .............. A01K 27/001 119/856 |
| 2002/0117121 A1 | * | 8/2002 | Sporn .................... A01K 27/00 119/856 |

(Continued)

FOREIGN PATENT DOCUMENTS

NL    9000847 A   * 11/1991   ........... A01K 27/001

*Primary Examiner* — Monica L Williams
(74) *Attorney, Agent, or Firm* — Chun-Ming Shih

(57) ABSTRACT

A collar structure for pets includes a belt with a first elastic layer, a soft ribbon layer and a second elastic layer, wherein the soft ribbon layer is sandwiched between the first elastic layer and the second elastic layer, and an end of the belt is fixed onto a connector body while the other end of the belt wraps around a target position and penetrates through the connector body such that the other end of the belt can be fixed onto the connector body. Seeing that any one or ones of the first elastic layer, the soft ribbon layer or the second elastic layer is/are made of materials having at least a pesticide or fragrance additive, the collar structure for pets according to the present invention can achieve the effects of disinsection or aroma.

5 Claims, 5 Drawing Sheets

(51) Int. Cl.
 *B32B 25/20* (2006.01)
 *B32B 3/08* (2006.01)

(56) References Cited

U.S. PATENT DOCUMENTS

| | | | | |
|---|---|---|---|---|
| 2005/0284419 A1* | 12/2005 | Bazar | .................... | A01K 27/001 |
| | | | | 119/856 |
| 2009/0095233 A1* | 4/2009 | Trujillo | ................ | A01K 27/001 |
| | | | | 119/855 |
| 2011/0209674 A1* | 9/2011 | Gordon | ................ | A01K 27/001 |
| | | | | 119/865 |
| 2012/0216757 A1* | 8/2012 | Davis, Jr. | .............. | A01K 27/001 |
| | | | | 119/863 |
| 2015/0342147 A1* | 12/2015 | Cheng | ................. | A01K 27/001 |
| | | | | 119/863 |
| 2016/0095298 A1* | 4/2016 | Bodrie | ................ | A01K 27/001 |
| | | | | 119/793 |

\* cited by examiner

COLLAR STRUCTURE FOR PETS

BACKGROUND OF THE INVENTION

1. Field of the Invention

The present invention generally concerns a collar structure for pets; in particular, it relates to a collar structure for pets enabling the effects of identification, disinsection or aroma.

2. Description of Related Art

It is common to see many people step out for a stroll or do their jogging in a park or suburban area while walking their pets at the same time so as to perform recreational activities and further build more intimate relationships with their own pets. Besides, this may also help train a pet's physical conditions; taking a dog as an example, the cardiopulmonary function of a dog may be improved if it can walk or run all along with such outdoor activities, thus certain products, e.g., dog collars or the like, emerge in the market.

However, since this kind of products are mostly fabricated by means of extrusion molding processes with rubber, silicone materials or the like, and then cutting them into multiple segments, suppose it is intended to make an identification pattern comprising various colors, textures, graphics or the combinations thereof on the collar, it may be quite difficult to do so in practice; moreover, to additionally place the identification pattern on the surface of an extrusion molded collar, manufacture costs may adversely increase as well.

Therefore, the present invention can be an optimal solution if it allows to design a collar structure for pets which, during manufacture processes, provides an identification pattern having various colors, textures, graphics or the combination thereof, and whose materials applied in the manufacture processes may further contain pesticides, essential oils or perfumes to generate the effects of identification, disinsection or aroma etc.

SUMMARY OF THE INVENTION

A collar structure for pets according to the present invention comprises a belt including a first elastic layer, a soft ribbon layer and a second elastic layer, wherein the soft ribbon layer is sandwiched between the first elastic layer and the second elastic layer, and an end of the belt is fixed onto a connector body while the other end of the belt wraps around a target position and penetrates through the connector body such that the other end of the belt can be fixed onto the connector body.

In a preferred embodiment, the connector body includes a connection part whose two ends respectively have two through-holes, in which an end of the belt is fixed onto the connector body while the other end of the belt penetrates into one through-hole and then exits from the other through-hole.

In a preferred embodiment, any one of, or both of, the two ends on the connection part of the connector body has a serrate structure.

In a preferred embodiment, the first elastic layer and the second elastic layer are made of soft and flexible materials.

In a preferred embodiment, the first elastic layer and the second elastic layer are made of rubber or silicone materials.

In a preferred embodiment, any one or ones of the first elastic layer, the soft ribbon layer or the second elastic layer is/are made of materials having at least an additive.

In a preferred embodiment, the additive may be pesticides, essential oils or perfumes.

In a preferred embodiment, the soft ribbon layer is made of woven cloth or paper materials.

In a preferred embodiment, the soft ribbon layer includes two surfaces, and one of, or both of, the two surfaces has/have the identification pattern of various colors, textures, graphics or the combination thereof.

DETAILED DESCRIPTION OF THE PREFERRED EMBODIMENTS

Other technical contents, aspects and effects concerning the present invention can be clearly appreciated through the detailed descriptions on the preferred embodiments of the present invention in conjunction with the appended drawings.

Figure 1:
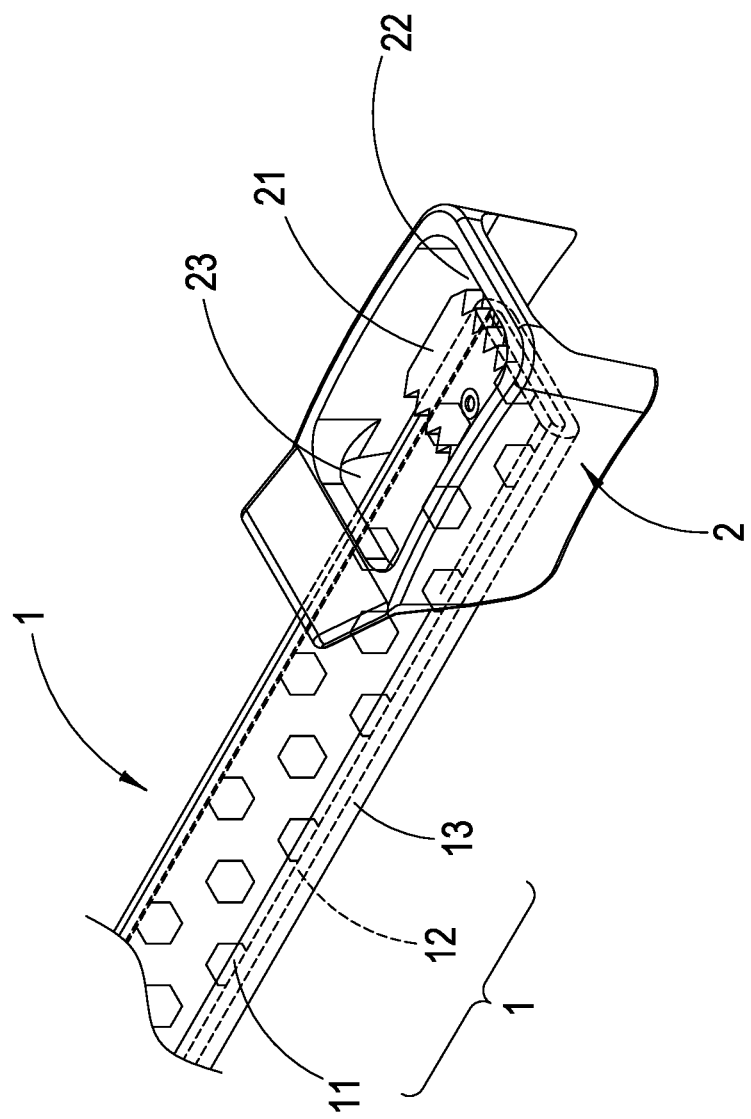
FIG. 1 shows an integral structure view of the collar structure for pets according to the present invention.
Figure 2:
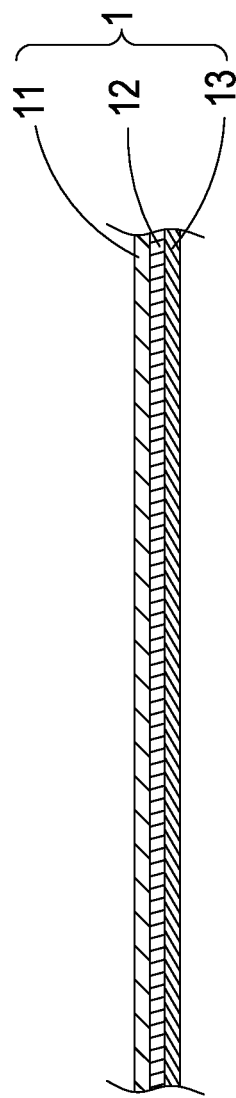
FIG. 2 shows a cross-section structure view of the belt in the collar structure for pets according to the present invention.

Refer first to FIGS. 1 and 2, wherein an integral structure view and a cross-section structure view of a belt in the collar structure for pets according to the present invention are respectively shown. It can be clearly appreciated for the Figures that the collar structure for pets comprises a belt 1 and a connector body 2, in which the belt 1 includes a first elastic layer 11, a soft ribbon layer 12 and a second elastic layer 13, the soft ribbon layer 12 is sandwiched between the second elastic layer 11 and the second elastic layer 13, and the connector body 2 has a connection part 21 whose two ends respectively have two through-holes 22, 23, and also an end of the belt 1 is fixed onto the bottom end of the connection part 21 in the connector body.

Herein the first elastic layer 11 and second elastic layer 13 are made of soft and flexible materials (e.g., rubber or silicone materials), and the soft ribbon layer 12 is made of woven cloth or paper materials. In addition, during manufacture processes, at least an additive may be doped into any one or ones of the first elastic layer, the soft ribbon layer or the second elastic layer, which can be optionally pesticides, essential oils or perfumes.

Moreover, the soft ribbon layer 12 includes two surfaces, and one of, or both of, the two surfaces has/have the identification pattern of various colors, textures, graphics or the combination thereof, such that, after completion of the collar structure for pets, the identification pattern on the soft ribbon layer 12 allows the collar structure for pets to provide the identification effect.

Figure 3A:
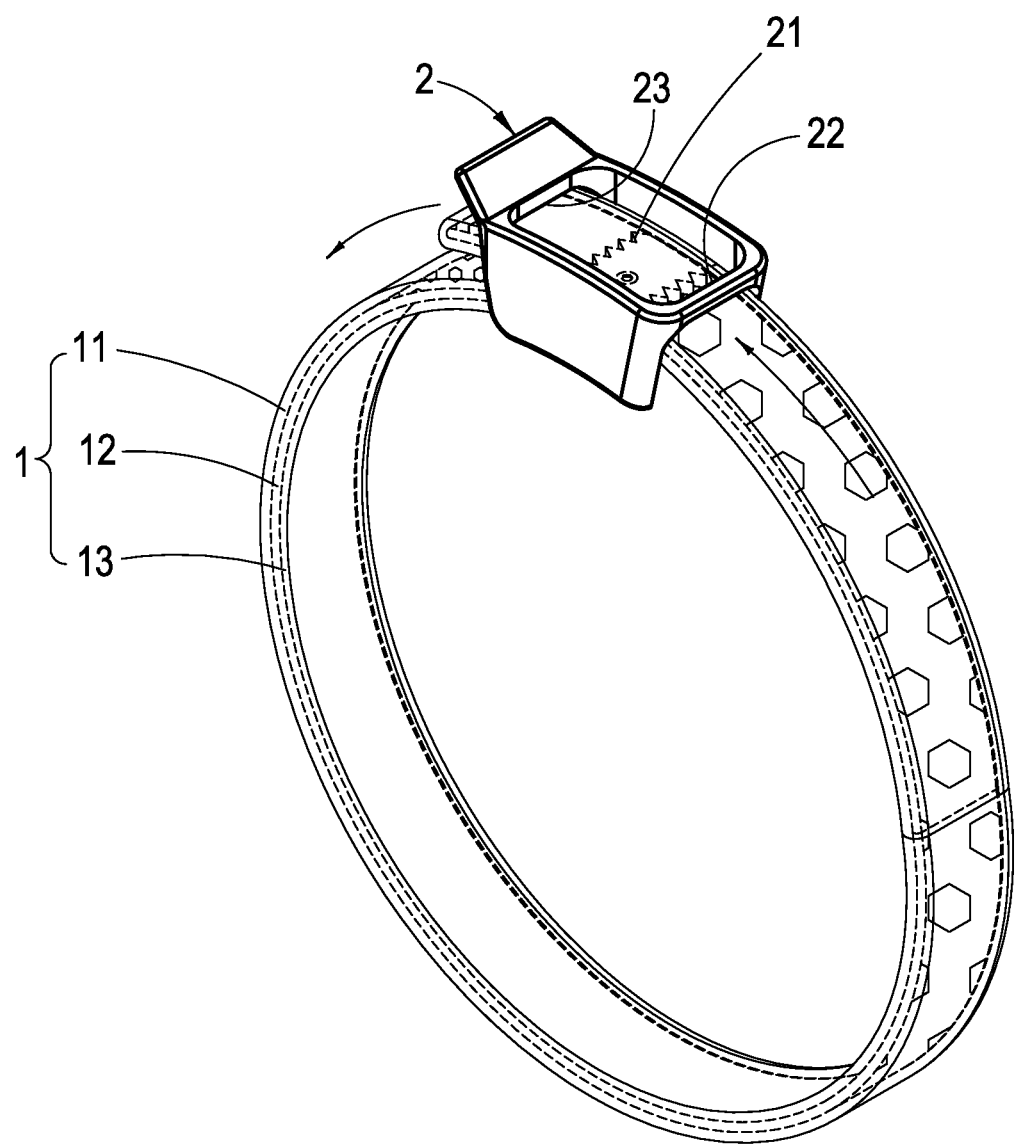
FIG. 3A shows a view for a pet collar implemented based on the collar structure for pets according to the present invention.
Figure 3B:
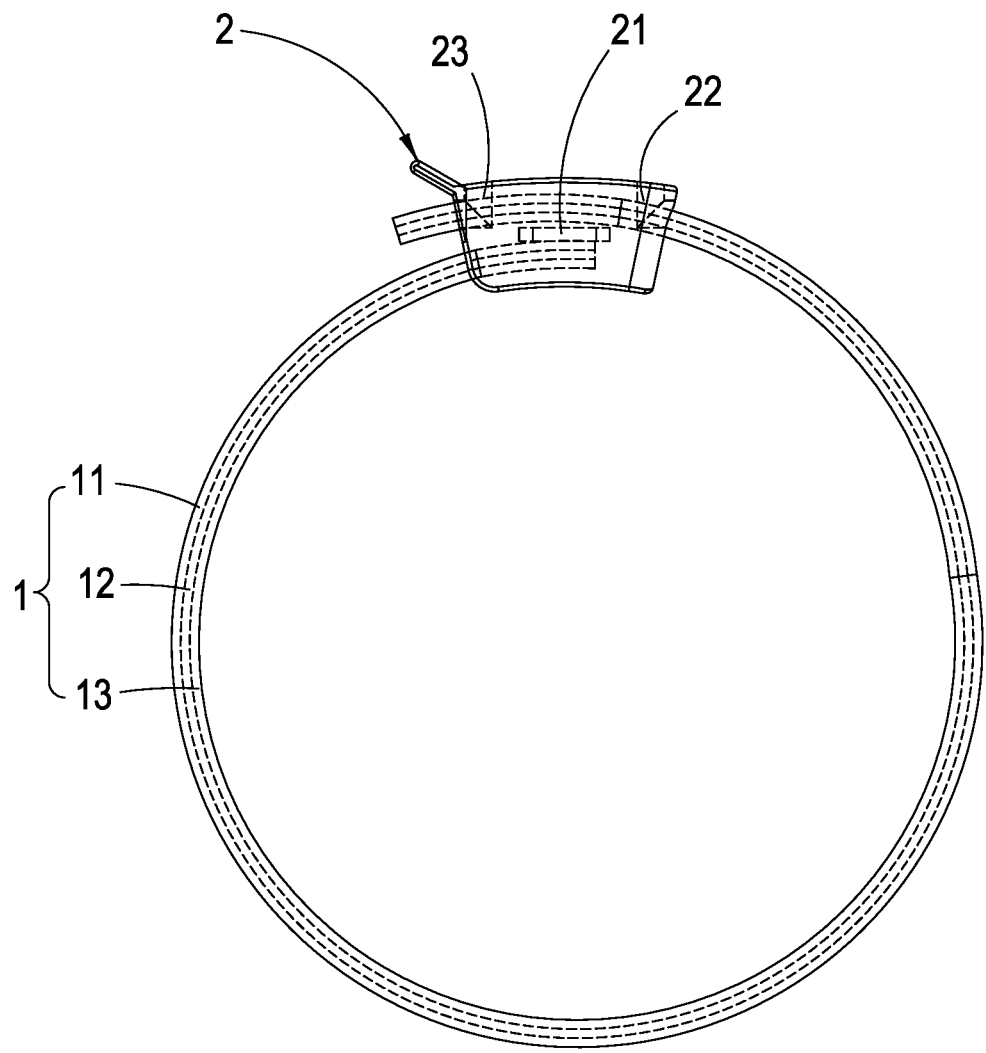
FIG. 3B shows a view for a pet collar implemented based on the collar structure for pets according to the present invention.

Furthermore, as shown in FIG. 3A, the other end of the belt 1 wraps around a target position, penetrates into the through-hole 22 on the connector body 2 and then exits from the through-hole 23. Afterwards, as shown in FIG. 3B, it is required to pull the other end of the belt 1 outwardly so as to make the two ends of the belt 1 closely overlap. Further, since the edges on the two ends of the connection part 21 in the connector body 2 are configured with serrate structures, the belt 1 can wrap around one circle and then be conveniently fixed onto the connector body 2.

Figure 4:
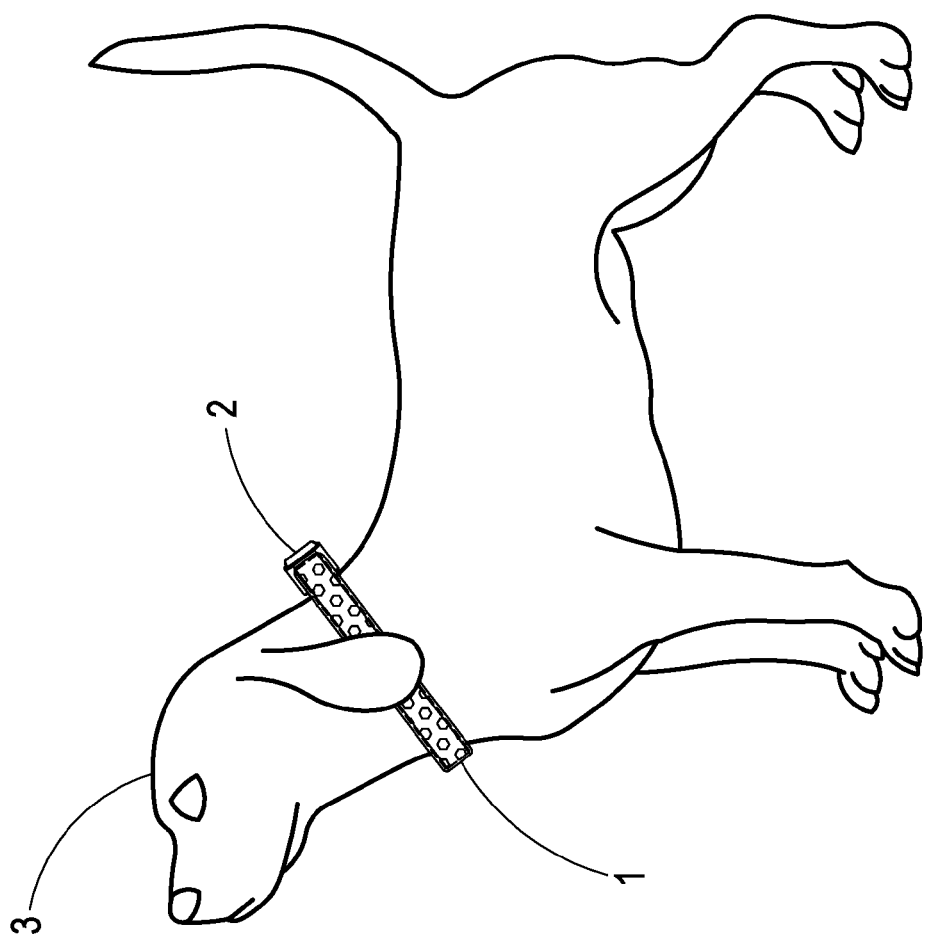
FIG. 4 shows an application view of the collar structure for pets according to the present invention.

Additionally, the application shown in FIG. 4 features that it is possible to wrap another end of the belt 1 around the neck of a pet 3, then let the other end of the belt 1 go through the through-hole 23 so as to pull the other end of the belt 1 straight outwardly thus fixing the belt 1 onto the connector body 2 to effectively form a pet collar.

Also, in addition to the above-said collar function, it is further possible to wrap the other end of the belt 1 around the wrist of a user to act as a wrist ring.

Compared with other conventional technologies, the collar structure for pets according to the present invention provides the following advantage(s):

1. The collar structure for pets according to the present invention allows to, during manufacture processes, provide an identification pattern having various colors, textures, graphics or the combination thereof, and whose materials applied in the manufacture processes may further contain pesticides, essential oils or fragrances etc. in order to offer the effects of identification, disinfection or aroma and so forth.

It should be noticed that, although the present invention has been disclosed via the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence the scope of the present invention to be protected under the patent laws should be delineated in accordance with the claims set forth hereunder in the present specification.

What is claimed is:

1. A collar structure for pets comprising:
a belt consisting of a first elastic layer, a soft ribbon layer and a second elastic layer, wherein the soft ribbon layer is sandwiched between the first elastic layer and the second elastic layer; an end of the belt is fixed onto a connector body while the other end of the belt wraps around a target position and penetrates through the connector body such that the other end of the belt can be fixed onto the connector body; at least one of the first elastic layer and the second elastic layer is made of materials having an additive selected from the group consisting of pesticides, essential oils, perfumes, and the combination thereof; the soft ribbon layer is made of paper materials; the soft ribbon layer has two surfaces, and at least one of the two surfaces has the identification pattern of various colors, graphics or the combination thereof.

2. The collar structure for pets according to claim 1, wherein the connector body includes a connection part whose two ends respectively have two through-holes, in which an end of the belt is fixed onto the connector body while the other end of the belt penetrates into one through-hole and then exits from the other through-hole.

3. The collar structure for pets according to claim 1, wherein any one of, or both of, the two ends on the connection part of the connector body has a serrate structure.

4. The collar structure for pets according to claim 1, wherein the first elastic layer and the second elastic layer are made of soft and flexible materials.

5. The collar structure for pets according to claim 4, wherein the first elastic layer and the second elastic layer are made of rubber or silicone materials.

\* \* \* \* \*